UNITED STATES PATENT OFFICE.

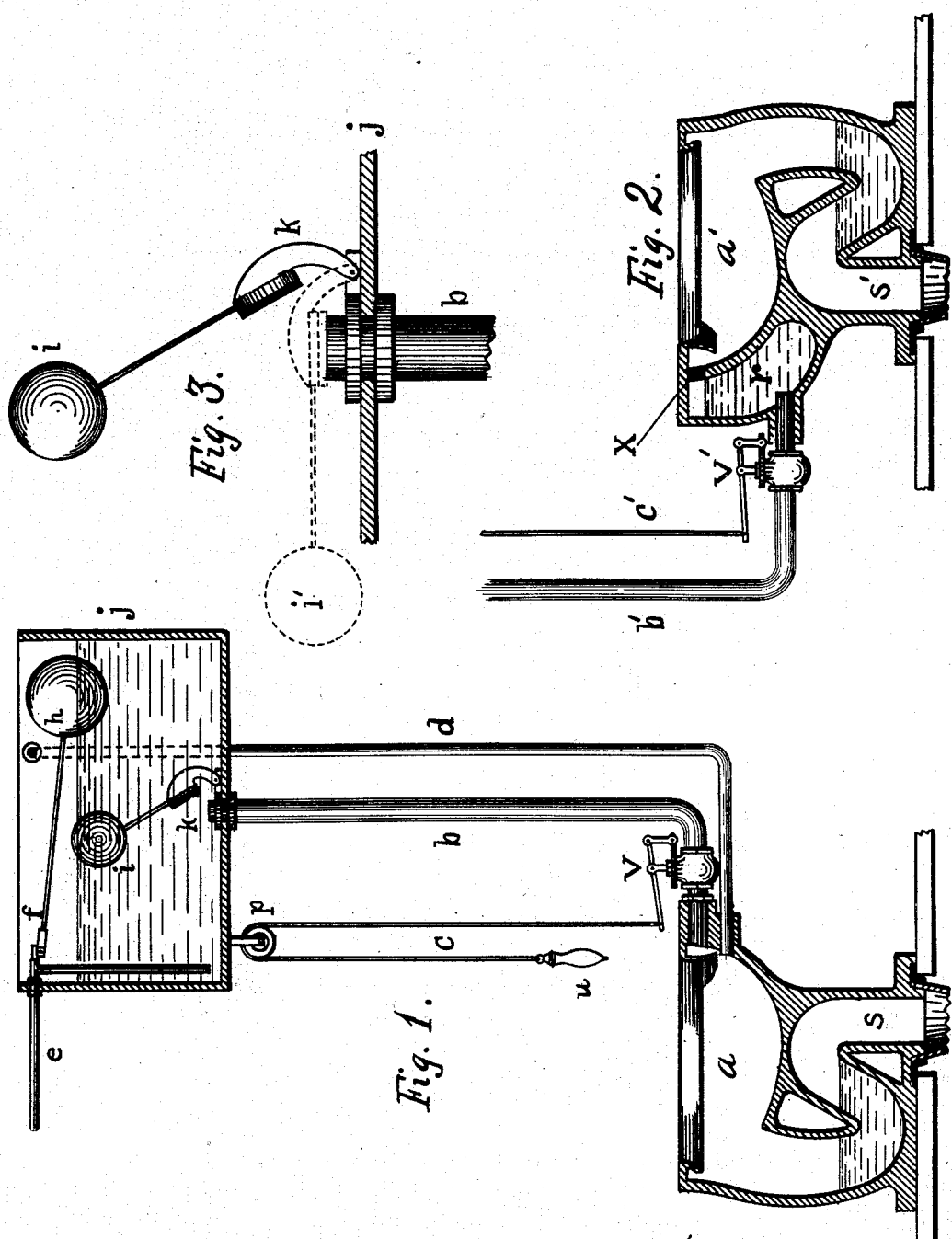

FREDERIC STANTON PERRIN, OF NEW YORK, N. Y., ASSIGNOR TO THE SCHMIDT-PERRIN MANUFACTURING COMPANY, OF JERSEY CITY, NEW JERSEY.

WATER-CLOSET.

SPECIFICATION forming part of Letters Patent No. 673,820, dated May 7, 1901.

Application filed January 5, 1900. Serial No. 477. (No model.)

*To all whom it may concern:*

Be it known that I, FREDERIC STANTON PERRIN, a citizen of the United States, residing at the city of New York, in the county and State of New York, have invented a new and useful Improvement in Water-Closets, of which the following is a specification.

My invention relates to water-closets in which the bowl is flushed and cleansed by a liberal quantity of water stored in a supply-tank from any suitable source.

The object of my improvement is to provide a water-closet noiseless in operation, one in which the water used for cleansing will pass from the supply-tank to and through the bowl without noise; and to accomplish my object I provide a valve in the service-pipe in close proximity to the bowl and a float-valve at the upper extremity of the service-pipe within the supply-tank to close the service-pipe before the level of the water in the supply-tank reaches the opening in the service-pipe, to maintain at all times a column of water between the supply-tank and the inlet to the bowl, and prevent air from entering the service-pipe.

The water-closets in general use at the present time create a loud and objectionable noise when flushed by water from a supply-tank caused by the entrance of air into the service-pipe and its escape within the bowl. By my invention the service-pipe is always filled with water and air cannot enter therein.

In the drawings which form part of this specification, Figure 1 is a sectional view of a supply-tank and closet-bowl constructed in accordance with my invention. Fig. 2 is a sectional view of a closet-bowl having a reservoir at its rear, into which the service-pipe enters; and Fig. 3 is an enlarged view of the float-valve at the inlet of the service-pipe within the tank.

Similar reference-letters in the several figures indicate similar parts.

In Fig. 1, $a$ represents an ordinary properly-trapped bowl with the outlet S. $b$ is the service-pipe, extending from the supply-tank $j$ to the bowl $a$, having at its lowest extremity the flush-controlling spring-valve V, which is opened by pulling the handle $u$, attached to the cord $c$, that runs over the pulley $p$, and having at its upper extremity the valve $k$, to which is attached the float $i$. $e$ indicates the pipe for supplying water to the tank $j$. $f$ is the supply-valve, operated by the float $h$, and $d$ represents an overflow-pipe to prevent the tank $j$ from overflowing in case the valve $f$ should not operate properly. Normally the supply-tank $j$ and the service-pipe $b$ are filled with water and the valve $k$ is open, as shown in Fig. 1. When it is desired to discharge the bowl $a$ of its contents, the operator opens the valve $v$ by pulling the cord $c$ at the handle $u$, allowing the water in the tank $j$ to force the water in the service-pipe $b$ through the inlet to the bowl $a$, discharging the contents as usual. As the water in the tank $j$ descends through the service-pipe $b$ the float $i$, attached to the valve $k$, gradually lowers until the valve $k$ rests upon the inlet to the service-pipe $b$ and closes the same, preventing the remaining water in the tank $j$ from entering the pipe $b$. The float $i$ is adjusted to close the inlet to the pipe $b$ before the level of the water in the tank $j$ descends to the inlet to the pipe $b$, thus preventing the tank $j$ from emptying and allowing air to enter the service-pipe $b$. When the valve $k$ closes the pipe $b$, the water is virtually shut off from the bowl $a$. Then, as usual in such a case, the handle $u$ is released and the valve $v$ closes. As the water gradually enters the tank $j$ through the pipe $e$ on account of the float $h$ having descended and opened the valve $f$ the float $i$ will rise and remove the valve $k$ from the opening in the pipe $b$, as shown in Fig. 3, placing the apparatus in its normal condition ready for a similar operation.

In Fig. 2 I have shown a modification of my invention consisting of a closet-bowl containing a small reservoir $r$, into which the service-pipe $b'$ enters. This reservoir $r$ is always filled with water that extends up to the bowl-inlet $x$. The valve $v'$ is located in the service-pipe $b'$ below the level of the water within the reservoir $r$ to insure a supply of water between the valve $v'$ and the inlet $x$. The operation is similar to that of Fig. 1, with the advantage that the valve $v'$ may be placed in any position or distance from the bowl $a'$, provided it is below the inlet $x$. When the valve $v'$ is opened, the water in the service-pipe $b'$ forces the water in the reservoir $r$ through the inlet $x$ and cleanses the bowl, and when the valve $v'$ is closed the reservoir $r$ remains filled from the valve $v'$ to the inlet $x$, thus preventing the entrance of air in the service-pipe between the valve $v'$ and the bowl $a'$ and maintaining a column of water from the inlet $x$ to the supply-tank.

Fig. 3 is an enlarged view of the float-valve for closing the service-pipe before the water in the supply-tank is entirely discharged. The metal body of the valve K is pivoted to an arm attached to the pipe $b$ and carries upon its face a rubber or leather washer that fits over the inlet of the pipe $b$ when the valve is down, as shown in dotted lines. To the body of the valve $k$ is attached a float $i$ in such a manner that the float will rise and fall with the water in the supply-tank, and in doing so will swing the valve $k$ upon its pivot or hinge to close and open the pipe $b$.

It will readily be seen I may dispense with the float $i$ and operate the valve $k$ by attaching it to the float $h$, Fig. 1, with any suitable flexible connection; but I prefer to show this valve operated by an independent float.

I am aware that prior to my invention water-closets have been made with supply-tanks in conjunction with service-pipes, and I therefore do not claim such a combination broadly; but What I do claim as my invention, and desire to secure by Letters Patent, is—

1. The combination with a water-closet bowl, a water-supply tank and a service-pipe leading therefrom to the bowl, of a flush-controlling valve located at the lower extremity of the service-pipe adjacent to the bowl, and a self-opening and self-closing float-valve at the upper extremity or inlet of the service-pipe, automatically operated by the rising and falling of the water within the water-supply tank, substantially as described.

2. In a water-closet, the combination with a water-supply tank, of a bowl provided with a reservoir communicating with the flushing-inlet of the bowl, a service-pipe extending from the water-supply tank into the reservoir, a flush-controlling valve located in the service-pipe below the level of the water in the reservoir and a self-opening and self-closing float-valve at the inlet of the service-pipe automatically opened and closed by the rising and falling of the water within the water-supply tank, substantially as described.

3. In a water-closet, the combination with the bowl, the elevated water-supply tank and the service-pipe leading therefrom to the bowl, of a flush-controlling valve, located in the service-pipe adjacent to the bowl, to maintain a continuous column of water between the supply-tank and the bowl, and a float-valve located within the water-supply tank, automatically closing the service-pipe inlet before the level of the water in the supply-tank descends to the service-pipe inlet, to exclude air from the service-pipe, substantially as described.

FREDERIC STANTON PERRIN.

Witnesses:
JOHN J. McCUTCHAN,
ERNEST N. PERRIN.